United States Patent

[11] 3,586,405

| | | | |
|---|---|---|---|
| [72] | Inventor | Georg Claesson<br>Turin, Italy | |
| [21] | Appl. No. | 812,746 | |
| [22] | Filed | Apr. 2, 1969 | |
| [45] | Patented | June 22, 1971 | |
| [73] | Assignee | RIV-SKF Officine Di Villar Perosa S.p.A.<br>Turin, Italy | |
| [32] | Priority | Apr. 23, 1968 | |
| [33] | | Italy | |
| [31] | | 51403A/68 | |

[54] CAGES FOR BEARING ROLLING ELEMENTS
4 Claims, 4 Drawing Figs.
[52] U.S. Cl. ........................................................ 308/201
[51] Int. Cl. ..................................................... F16c 33/38

[50] Field of Search............................................ 308/201, 217

[56] References Cited
FOREIGN PATENTS
1,104,870  6/1955  France .......................... 308/201

Primary Examiner—Fred C. Mattern, Jr.
Assistant Examiner—Frank Susko
Attorney—Sughrue, Rothwell, Mion, Zinn & MacPeak ABSTRACT: A cage for rolling elements of a bearing, for example a ball bearing, is molded in two identical halves which are interconnected by cooperating pins and sockets. Each cage half is provided with one pin and one socket between each pair of consecutive recesses defining the cage apertures for receiving respective bearing rolling elements.

CAGES FOR BEARING ROLLING ELEMENTS

This invention relates to cages for bearing rolling elements, for example balls in ball bearings.

It is known to form such bearing cages from two moulded cage halves, for example, of plastics, interconnected by pins and sockets alternately provided between the recesses for accommodating the bearing rolling elements.

In known cages of this type it was possible to form an annular bearing cage from two identical cage halves only for bearings having an even number of rolling elements; with bearings having an odd number of rolling elements no satisfactory cage construction of this type with identical halves could be found. Moreover, in such known cage constructions the interconnection of the cage halves by resilient interengagement of the pins and sockets was not in practice sufficiently tight.

An object of the present invention is to obviate the above drawbacks of the previously known cage constructions, more particularly to provide a cage construction having identical halves.

The main characteristic feature of the cage according to the invention is that the cage halves are identical and each is formed between each pair of consecutive aperture-defining recess with both a pin and a socket engageable with a respective socket and pin of the other cage half, the axes of the pins and sockets in the cage halves when assembled being disposed on a common cylindrical surface coaxial with the cage axis.

The invention also provides an annular bearing cage half for forming a bearing cage as defined above, characterized by comprising a plurality of spaced-apart recesses for accommodating bearing rolling elements and a respective pin and socket disposed between each adjacent pair of recesses and spaced apart on a common cylindrical surface coaxial with the axis of the cage half, the axis of each pin and each socket being spaced a common distance from the geometrical center of the respective recess closest thereto.

With the construction of the invention, identity and interchangeability of the cage halves is ensured independently of the number of rolling elements of the bearing. Moreover, a double connection is provided between the two cage halves on each side of each cage aperture; this is particularly advantageous as regards the fatigue strength of the assembled bearing cage. In view of its structural symmetry a cage according to the invention is fully balanced both statically and dynamically.

One embodiment of the invention will be described, by way of example, with reference to the accompanying drawings, in which.

Figure 3:
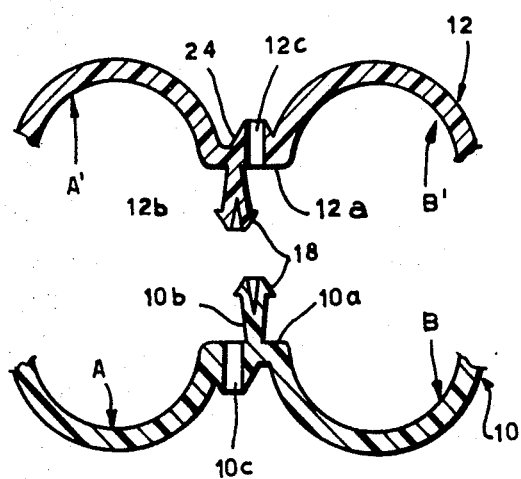
FIG. 3 is a cross-sectional view of the bearing cage taken along the arc III III in FIG. 1, showing the two cage halves separated and juxtaposed prior to joining of the halves to form the bearing cage.

Referring to the drawings, a bearing cage G having apertures accommodating the balls S of a ball bearing is made up of two identical cage halves 10, 12, parts of each of which are shown in FIG. 3. The cage halves 10, 12 are moulded from suitable plastics, such as acetal, polyamide or polyolefin (such as polypropylene) resin.

Figure 2:
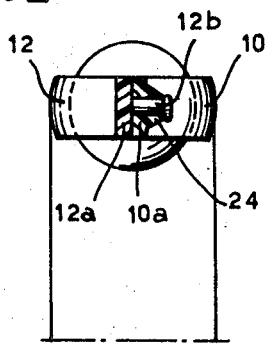
FIG. 2 is a cross-sectional view on line II–II of FIG. 1.

The apertures in the cage G accommodating the balls S are defined by respective pairs of aligned recesses A, A', B, B', —, in the cage halves 10, 12. The recesses of each cage half 10, 12 are separated by respective bridge pieces 10a, 12a which in the assembled cage G are superposed in face-to-face contact, as shown in FIG. 2.

Figure 1:
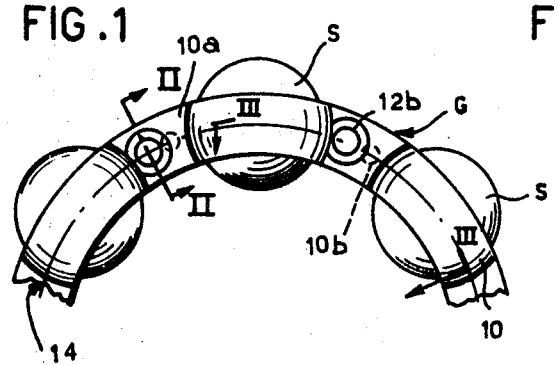
FIG. 1 is a partial view of a bearing provided with a cage according to the invention, in the direction of the axis of the bearing cage.
Figure 4:
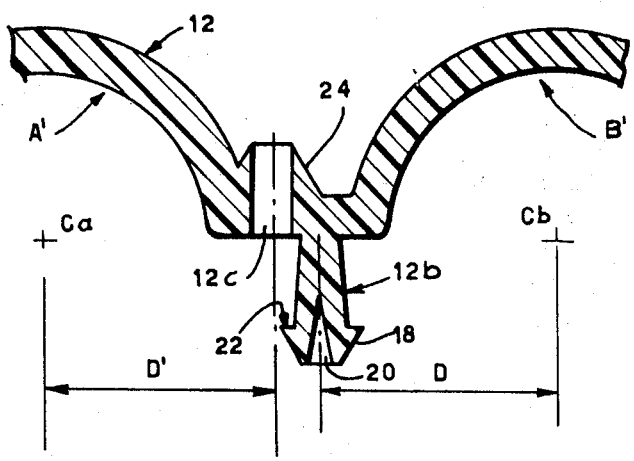
FIG. 4 is an enlarged cross-sectional view similar to that of FIG. 3 showing a detail of one of the cage halves.

Each bridge piece 10a, 12a is moulded integrally with a respective pin 10b, 12b extending axially from the inner face of the bridge piece and is also formed with an axially directed socket 10c, 12c adjacent the respective pin 10b, 12b. All the pins 10b, 12b and sockets 10c, 12c are located with their axes on a common cylindrical surface 14 (FIG. 1) coaxial with the cage axis. As shown in FIG. 4 with respect to the cage half 12 the spacing D of the axis of each pin 12b from the center Cb of the recess B' closest thereto is equal to the spacing D' of the axis of each socket 12c from the center Ca of the recess A' closest thereto. When, therefore, the two cages 10, 12 are juxtaposed and aligned for interconnection (FIG. 3) each pin 10b, 12b is accurately aligned with a respective socket 12c, 10c whether the number of balls S in the bearing is even or odd.

Since the cage halves 10, 12 are completely identical, a single mould may be used to form both cage halves.

The cross section of the pins 10b, 12b and sockets 10c, 12c may be circular, square, half-round (lunette) or of any other shape, the cross section being circular in the illustrated embodiment. Interlocking of the pins and sockets of the two assembled cage halves 10, 12 may be effected by various means, for example by automatic snap-fastening or with the aid of cold or hot deforming tools, having regard of the properties of the material from which the cage halves are moulded. For snap-fastening the pins 10b, 12b and/or sockets 10c, 12c should be designed for resilient radial deformation.

In the illustrated embodiment the pins 10b, 12b are each formed with a frustoconical head portion 18 tapering in cross section towards the outer end of the pin. Each pin is also formed with a central axially extending tapering bore 20 in its outer end to render the head portion 18 resiliently expansible. The head portion 18 terminates at its wider end in an annular shoulder 22 for snap engagement in a respective socket. Moreover, the external surface of each cage half is formed with a respective conical protuberance 24 surrounding each socket to afford a tear-resistant reinforcement. On insertion of the pin 10b, 12b into its respective socket 12c, 10c the frustoconical head portion 18 is resiliently compressed and upon emerging at the outer end of the socket it is self-secured by snap-engagement of the shoulder 22 behind the protuberances 24.

Obviously, the invention is not limited to the constructional details of the illustrated embodiments, the scope of the invention being defined in the appended claims.

What I claim is:

1. A bearing cage having apertures for accommodating bearing rolling elements and comprising two identical cage halves formed from plastic material with respective recessed portions defining such apertures and interengaging pins and sockets provided on the cage halves between such recessed portions and snap-engaged to interconnect the cage halves, each cage half being formed between each pair of adjacent aperture-defining recessed portions with both a pin and a socket that respectively engage a socket and a pin of the other cage half, each socket being formed as a perforation extending parallel to the cage axis through the material of the cage half and its circumference being surrounded fully by the material of the cage half, each socket surrounding the full circumference of a pin formed in the other cage half, the axes of all the sockets and pins being disposed in a common cylindrical surface coaxial with the cage axis.

2. Bearing cage as claimed in claim 1, in which each pin is formed with a resiliently expansible frustoconical head portion tapering in cross section towards the outer end of the pin and formed inwardly of said outer end with an annular shoulder for snap-engagement behind a respective socket.

3. Bearing cage as claimed in claim 2, in which each pin is formed with a central axially extending tapering bore in the outer end of the pin to render the head portion of the pin resiliently expansible.

4. Bearing cage as claimed in claim 1.